Figure 1:
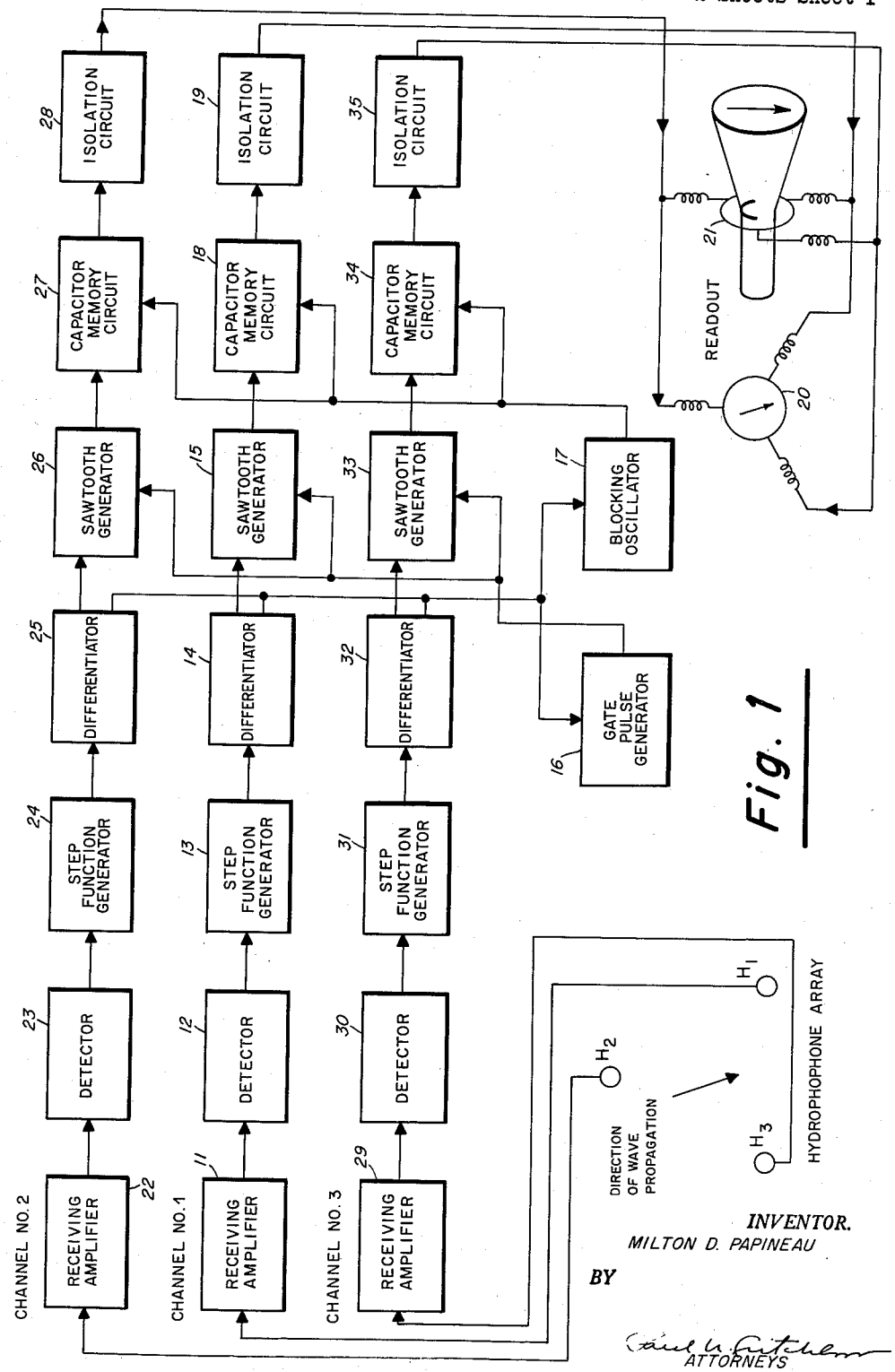

July 3, 1962  M. D. PAPINEAU  3,042,897
PASSIVE WAVE PROPAGATION DIRECTION INDICATOR
Filed May 27, 1959  2 Sheets-Sheet 1

INVENTOR.
MILTON D. PAPINEAU
BY
ATTORNEYS

INVENTOR.
MILTON D. PAPINEAU
BY

United States Patent Office 3,042,897
Patented July 3, 1962

3,042,897
PASSIVE WAVE PROPAGATION DIRECTION
INDICATOR
Milton D. Papineau, San Diego, Calif.
(424 Olohana St., Honolulu 15, Hawaii)
Filed May 27, 1959, Ser. No. 816,347
8 Claims. (Cl. 340—6)
(Granted under Title 35, U.S. Code (1952), sec. 266)

The invention described herein may be manufactured and used by or for the Government of the United States of America for governmental purposes without the payment of any royalties thereon or therefor.

The present invention relates to directional energy detection systems in general and in particular to a new and improved apparatus for determining the direction of received sonar signals.

In the prior art, considerable use has been made of moving directional transducers which sweep and search the receiving area. Although satisfactory for many purposes, such systems have proven to sometimes be cumbersome, time consuming, and lacking in accuracy, since they usually require reception of a relatively long signal.

In addition, systems employing the phase relation of signals produced by spaced hydrophones excited by incoming radiant energy have been used to indicate the bearing of the source of received energy. The efficiency and optimum operation of these configurations are, however, contingent in general upon having a knowledge of the frequency of the received energy signals; consequently, they are not ideally suited for use in a broadband system.

The present invention reduces and in some instances substantially eliminates most of the undesirable characteristics found in the above mentioned prior art systems. The improvements are achieved by making use of the principle that the delay in the time of arrival of a received signal such as a sonar ping at two hydrophones separated by a predetermined distance will vary as the cosine of the angle formed by the direction of propagation and the base line formed by the two hydrophones. Obviously, more than two hydrophones may be employed if so desired, and it has been found that three hydrophones arranged in the form of an equilateral triangle seems to provide very satisfactory results. Such arrangement provides three base lines with each hydrophone serving two adjacent base lines. A signal or ping received by said hydrophones and associated circuitry thus generates three delay periods, each of which is a function of the cosine of the angle formed by the direction of ping propagation and each of the three base lines. Establishing a bearing reference point for the array of three hydrophones and drawing a delay time versus array bearing plot for each of the base lines will result in the development of three cosine curves each shifted from the other by 120 degrees. Also, for any one propagation bearing, three delay times are produced from the wave front of the received ping which, in turn, may be converted into three voltages respectively proportional thereto and which can be used in a computing or readout apparatus to indicate the direction of propagation.

It is, therefore, a primary object of this invention to provide a system that will determine and indicate the direction of prapagation of pulsed electromagnetic waveforms.

Another object of this invention is to provide an apparatus for ascertaining and indicating the direction of received pulsed acoustical energy.

It is a further object of this invention to provide an apparatus for determining and indicating the sequence of arrivals of a pressure wave at various receiving locations.

It is another object of this invention to determine and indicate the direction of propagation of received sonar pings.

Other objects and many of the attendant advantages of this invention will become fully apparent from the following description of the annexed drawings which illustrate a preferred embodiment and wherein:

FIG. 1 is a block diagram of the circuit of the device constituting this invention; and FIG. 2 illustrates curves which are helpful in explaining the operation of the invention.

The conversion of pulse delay time between hydrophones to voltages proportional thereto may be readily understood by referring to FIG. 1 wherein three hydrophones $H_1$, $H_2$, and $H_3$ are shown in equilateral triangular array. These hydrophones may take the form of any conventional type transducers which may be appropriately used to sense and receive pertinent incoming signals and transform them into electrical output signals. The various and sundry system components used in conjunction with said hydrophones are likewise conventional in themselves; however, their arrangement, association, and combination constitute this invention and produce an improved signal sensing and direction indicating device.

The output signals from hydrophone $H_1$ are coupled to a first channel containing a receiving amplifier 11 of the type containing the bandwidth and noise characteristics desired. For example, one of the simplest types of amplifiers which may be employed in this system would be the untuned broadband type, although an automatic gain control would probably have to be incorporated therein to reduce the gain of the system to prevent noise or steady state signals of any kind in the pass band from exceeding the threshold of the operational signal level. If wide band operatoin is desired with the low noise factor of a narrow band receiver, the system constituting the subject invention is quite adaptable for use with auto-correlation type receiving amplifiers. Moreover, if desired, tuned amplifiers having the ability to separate pings of different frequencies may be used to an advantage if circumstances so warrant. The output from the receiving amplifier is detected in a detector 12 and its rectified envelope passed on as a critical voltage to a step function generator 13 of the two-way comparator type or the like. The leading edge of the step function generator output signal is differentiated by a differentiator 14 and used to trigger a sawtooth generator 15, a gate pulse generator 16, and a blocking oscillator 17. The voltage level which the sawtooth generator attains is stored in a capacitor memory circuit 18 from which it is passed on via an isolation circuit 19 to a readout apparatus including a D.C. selsyn bearing indicator 20 and a cathode ray tube bearing indicator 21. Obviously, either of the latter mentioned bearing indicator elements may be used alone as the readout apparatus, or, if so desired, any suitable computer equipment may be substituted therefor.

Similarly, the output signals from hydrophone $H_2$ are fed to a second channel including a receiving amplifier 22 and then in sequence to a detector 23, a step function generator 24, a differentiator 25, a sawtooth generator 26, a capacitor memory circuit 27, an isolation circuit 28 from which they are appropriately coupled to said readout apparatus containing D.C. selsyn bearing indicator 20 and cathode ray tube bearing indicator 21.

Likewise, the output signals from hydrophone $H_3$ are electrically coupled to a third channel which includes in series and in sequence a receiving amplifier 29, a detector 30, a step function generator 31, a differentiator 32, a saw tooth generator 33, a capacitor memory circuit 34, and an isolation circuit 35 from which they are also appropriately connected to the aforesaid readout apparatus containing either D.C. selsyn bearing indicator 20 or cathode ray tube bearing indicator 21 or both.

Differentiator 25 and differentiator 32 are also coupled to gate pulse generator 16 and blocking oscillator 17. Hence, it can be seen that gate pulse generator 16 may be opened by a trigger pulse from any one of the aforementioned differentiators and that the first pulse to be received by the gate pulse generator will actuate it and allow subsequently received trigger pulses from the other differentiators to pass through which, in turn, allows all of said trigger pulses to timely pass on and initiate the building up of voltages in their respective sawtooth generators. Gate pulse generator 16 is of the type that closes the gate at a predetermined period of time after it is opened to provide a reference datum from which the difference in time or time delay between the reception of the incoming propagation at each of the hydrophones is measured. Thus, the voltage generated by each of the sawtooth generators depends upon two functions:

(1) A gate pulse which has a fixed duration that is equal to or greater than the maximum delay time between hydrophones, and (2) The delay times between the time of arrival of the ping at the first hydrophone along the line of propagation and the others.

The former is triggered by whichever step function occurs first and limits the duration and level of each sawtooth voltage generated, while the latter is proportional to the direction of incoming ping propagation when vectorially summarized in computer or readout apparatus. In other words, the voltage developed by the sawtooth generator connected to the first hydrophone to receive the propagated ping will be maximum. The other two sawtooth generators each reach a voltage which is something less than said maximum voltage and which is a function of maximum time delay minus their respective actual time delays. Obviously, for proper operation and accurate direction indication, the slopes of the sawtooth voltages developed by the three sawtooth generators must be identical.

Blocking oscillator 17 has its output connected to capacitor memory circuits 18, 27, and 34 and transmits signals thereto which timely discharge said memory circuits after each sawtooth voltage cycle, thus preparing them for a new voltage cycle initiated by the reception of another signal ping by one of the hydrophones.

Figure 2A:
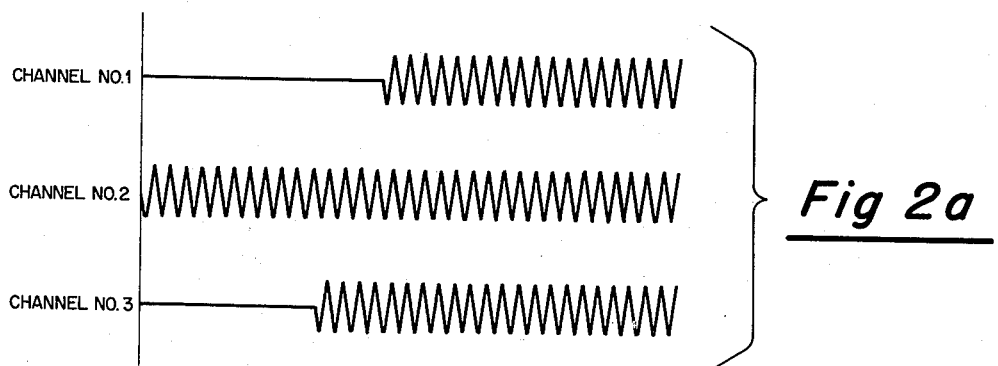
Figure 2B:
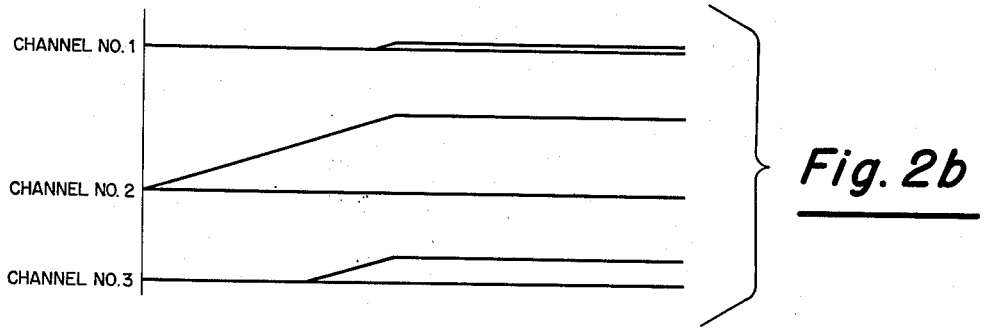
Figure 2C:
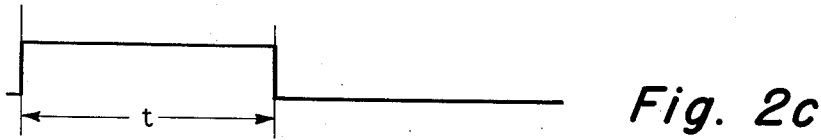
Figure 2D:
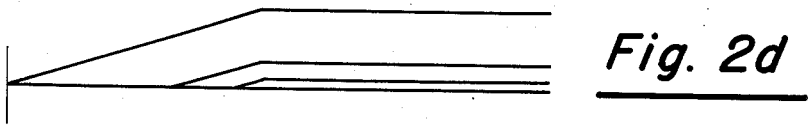
Figure 2E:

Briefly, the operation of the system as a whole is as follows. As the signal ping wavetrain passes each of the three hydrophones, it is timely converted into three electrical signals, one from each hydrophone according to its position relative to the others. To facilitate further use of these signals, they are fed to their respective channels where they are amplified. If, for example, the ping is coming from the direction indicated by the arrow depicted in the hydrophone array of FIG. 1, the resulting output voltages from the amplifiers of channels 1, 2, and 3 will appear as shown in FIG. 2(a). These relatively high frequency voltages are rectified or detected to obtain their envelope voltages and are then fed to step function generators for wave shaping. The leading edge of the step functions are differentiated and used to trigger the sawtooth generators which, in turn, build up voltages which are respectively proportional to the relative time of arrival of the ping at each hydrophone. Since in this example hydrophone $H_2$ was first to receive the ping illustrated by the aforementioned arrow in the hydrophone array of FIG. 1, the sawtooth generator output voltages may be represented by those of FIG. 2(b). These voltages are then fed to their respective channel capacitor memory circuits where they are stored after their further increase is prevented by the closing of the gate pulse generator. As shown in FIG. 2(c), the gate pulse generator is triggered by the first hydrophone channel to receive the incoming ping and open the gate for a predetermined period of time "t" which exceeds the maximum time delay between hydrophones and is thereby sufficient to pass the subsequent output signals of the other two hydrophones. When said predetermined time has expired, the gate pulse generator effectively and simultaneously prevents further increase of all three sawtooth voltages, thereby producing corresponding total voltages which vary according to the arrival time of the ping propagation at each hydrophone. The voltages from all capacitor memory circuits are represented by the curves of FIG. 2(d) and remain at such values until discharged by the blocking oscillator pulse shown in FIG. 2(e) in preparation for another ping cycle. They differ from each other as the cosine of the angle of arrival of the ping wavetrain with the corresponding base line between hydrophones. By applying them through isolation circuits to appropriate readout equipment, their cosine differences are resolved into an indication of ping propagation direction.

Various modifications are contemplated and may obviously be resorted to by those skilled in the art without departing from the spirit and scope of the invention as hereinafter defined by the appended claims, as only a preferred embodiment thereof has been disclosed.

What is claimed is:

1. A wave propagation direction indicator comprising a trio of transducers arranged to form an equilateral triangle, said transducers being adapted to receive pressure wave energy and produce electrical signals simultaneously with the reception thereof and in response thereto, means connected to said transducers for amplifying the electrical signals therefrom, means connected to said amplifier means for detecting said amplified signals, step function generator means connected to said detector means for shaping said detected signals into waveforms having substantially square wavefronts, differentiator means connected to said step function generator means for transforming said wavefronts into trigger pulses, sawtooth generator means responsive to and initiated by said trigger pulses from said differentiator means for converting same into a trio of increasing voltages, a pulse gate generator connected to said differentiator means and said sawtooth generator means for disrupting the increase of said trio of increasing voltages after a predetermined period of time, whereby said disrupted voltages are each held at a level which is proportional to the relative time delays between the reception of said pressure wave at each of said trio of transducers respectively, memory circuit means connected to said sawtooth generator means responsive to said disrupted voltages for storing same at their level of disruption, means for resolving and reading out said stored voltages in terms of wave propagation bearing, means interposed between said memory circuit means and said resolving and readout means for effectively preventing electrical interference therebetween, and means connected between said differentiator means and said memory circuit means for blanking the latter after said stored voltages are resolved by said readout means in preparation for repeating the pressure wave reception cycle.

2. The apparatus of claim 1 wherein the means connected to said transducer means for amplifying the electrical signals therefrom comprises a broadband amplifier.

3. The apparatus of claim 1 wherein the means connected to said transducer means for amplifying the electrical signals therefrom includes an amplifier which may be turned to receive and separate propagated wave pings of different frequencies.

4. A wave propagation direction indicator comprising in combination, a trio of transducer means spatially disposed in a predetermined triangular configuration, each of said transducer means being adapted for receiving propagated energy and producing an electrical output signal substantially simultaneously with the reception thereof and in response thereto, detector means effectively connected to each of said transducer means for respectively converting the electrical output signals therefrom into a trio of signals consisting of the rectified envelopes thereof, means connected to said detector means for respectively shaping the rectified envelopes therefrom into a trio of signals having substantially square wavefronts, means connected to said shaping means for respectively transforming said square wavefront signals into a trio of trigger pulses, means connected to said transforming means for respectively converting said trigger pulses into a trio of increasing voltages, means coupled to said converting means for simultaneously disrupting the increase of said trio of increasing voltages after a predetermined period of time, whereby each of said voltages is disrupted at a level which is respectively proportional to the relative intervals between the times of reception of said propagated energy by the aforesaid trio of transducer means, means connected to said trigger pulse converting means for respectively storing the increasing voltages therefrom at their disrupted levels, means effectively connected to said storing means for resolving and reading out the voltages stored therein in terms of the bearing of the aforesaid received propagated energy, and means connected between said transforming means and the aforesaid storing means for blanking said storing means after the voltages stored therein are resolved and readout in preparation for repeating the energy reception and bearing indication cycle.

5. A wave propagation direction indicator comprising in combination, a trio of transducers spatially disposed a predetermined distance from each other to form substantially an equilateral triangular configuration, each of the transducers of said trio of transducers being adapted for receiving propagated energy and producing an electrical output signal in response thereto at the time of reception thereof, a trio of channel means each of which is connected to each of said trio of transducers for respectively initiating the generation of a trio of increasing output voltages in response to the electrical output signals timely produced thereby, gate means coupled to said trio of channel means for simultaneously discontinuing the increase of the aforesaid trio of increasing output voltages at a predetermined time after said trio of transducers have produced their electrical output signals, means connected to the aforesaid trio of channel means for respectively storing said trio of increasing output voltages at their discontinued voltage levels, means coupled to said storing means for resolving and reading out the trio of voltages stored therein in terms of the direction of travel of said propagated energy, and blocking oscillator means connected between said trio of channel means and said storing means for blanking said storing means after the voltages stored therein are resolved and readout by the aforesaid resolving and readout means.

6. The device of claim 5 wherein said trio of transducers are a trio of sonor hydrophones adapted to be operated within a subaqueous medium.

7. The device of claim 5 wherein said means coupled to said storing means for resolving and reading out the trio of voltages stored therein in terms of the direction of travel of said propagated energy is a direct current selsyn bearing indicator.

8. The device of claim 5 wherein said means coupled to said storing means for resolving and reading out the trio of voltages stored therein in terms of the direction of travel of said propagated energy is a cathode ray tube bearing indicator.

References Cited in the file of this patent

UNITED STATES PATENTS

| | | |
|---|---|---|
| 2,400,552 | Hoover | May 21, 1946 |
| 2,415,088 | Dingley | Feb. 4, 1947 |
| 2,424,773 | Rieber | July 29, 1947 |
| 2,434,644 | Fairweather | Jan. 20, 1948 |
| 2,539,402 | Clark | Jan. 30, 1951 |
| 2,800,654 | De Rosa | July 23, 1957 |
| 2,916,289 | Zitto | Dec. 8, 1959 |
| 3,005,200 | O'Meara | Oct. 17, 1961 |